(12) United States Patent
Blinn et al.

(10) Patent No.: US 7,398,250 B2
(45) Date of Patent: Jul. 8, 2008

(54) METHOD AND SYSTEM FOR RESTRICTING THE USAGE OF PAYMENT ACCOUNTS

(75) Inventors: Arnold Neil Blinn, Bellevue, WA (US); Joseph N. Coco, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 730 days.

(21) Appl. No.: 10/890,418

(22) Filed: Jul. 13, 2004

(65) Prior Publication Data

US 2004/0249753 A1  Dec. 9, 2004

Related U.S. Application Data

(62) Division of application No. 09/675,467, filed on Sep. 28, 2000, now Pat. No. 7,337,144.

(51) Int. Cl.
*G06Q 40/00* (2006.01)
(52) U.S. Cl. .................. 705/41; 705/39; 705/35
(58) Field of Classification Search .................. 705/41, 705/39, 35
See application file for complete search history.

(56) References Cited

U.S. PATENT DOCUMENTS

| | | | |
|---|---|---|---|
| 5,365,044 A * | 11/1994 | Hesshaus | 235/375 |
| 5,744,787 A * | 4/1998 | Teicher | 235/380 |
| 5,883,810 A | 3/1999 | Franklin et al. | |
| 5,991,876 A | 11/1999 | Johnson et al. | |
| 6,101,477 A | 8/2000 | Hohle et al. | |
| 6,108,642 A | 8/2000 | Findley | |
| 6,173,269 B1 | 1/2001 | Solokl et al. | |
| 6,226,624 B1 | 5/2001 | Watson et al. | |
| 6,339,766 B1 | 1/2002 | Gephart | |
| 6,529,725 B1 | 3/2003 | Joao et al. | |
| 6,609,113 B1 | 8/2003 | O'Leary et al. | |
| 6,611,819 B1 | 8/2003 | Oneda | |
| 6,629,081 B1 | 9/2003 | Cornelius et al. | |
| 6,636,833 B1 | 10/2003 | Flitcroft et al. | |
| 6,704,714 B1 | 3/2004 | O'Leary et al. | |
| 6,789,189 B2 | 9/2004 | Wheeler et al. | |
| 7,006,993 B1 * | 2/2006 | Cheong et al. | 705/38 |
| 2002/0111907 A1 | 8/2002 | Ling | |
| 2003/0028481 A1 | 2/2003 | Filtcroft et al. | |

\* cited by examiner

*Primary Examiner*—Jagdish N Patel
(74) *Attorney, Agent, or Firm*—Lee & Hayes, PLLC

(57) ABSTRACT

A user's ability to spend and/or receive funds for payment accounts maintained in an electronic wallet are limited. These limitations include restrictions on where the user is able to spend the funds in a payment account (e.g., at which merchants the funds can be spent, whether the funds can be withdrawn from an ATM, etc.). These limitations may also include restrictions on what other payment accounts the user can receive funds from and/or transfer funds to, thereby limiting person-to-person fund transfers.

12 Claims, 8 Drawing Sheets

METHOD AND SYSTEM FOR RESTRICTING THE USAGE OF PAYMENT ACCOUNTS

RELATED APPLICATIONS

This is a division of application Ser. No. 09/675,467, filed Sep. 28, 2000, entitled "Method and System for Restricting the Usage of Payment Accounts", to Arnold N. Blinn and Joseph N. Coco.

TECHNICAL FIELD

This invention relates to electronic commerce, and more particularly to restricting the usage of payment accounts.

BACKGROUND OF THE INVENTION

As computer systems throughout the world are becoming increasingly connected via the Internet, the uses for the Internet are similarly expanding. One rapidly growing use of the Internet is for electronic commerce, where merchants make goods and/or services available for purchase "on-line" via the Internet. Such purchases may be delivered via the Internet (e.g., software downloaded from the merchant to the purchaser's computer) or alternatively delivered via more traditional in-person routes (e.g., mailing a product using the postal service).

Although the types and sources of goods and/or services available for purchase on-line have increased, difficulties have been encountered in providing a way for users to pay for these purchases. One solution is to provide an electronic wallet for each user where he or she can store account and address information for multiple different types of accounts, such as credit cards, debit cards, gift certificates, rebates, etc. One such solution is described in co-pending application Ser. No. 09/675,466, entitled "Integrating Payment accounts And An Electronic Wallet", to Arnold Blinn, Joseph Coco, and Greg Marks.

However, problems can be encountered when using electronic wallets because there is typically little or no ability to restrict the usage of accounts identified in the wallet. While a credit card stored in a wallet could be spent at any location that accepts this credit card, it may be desirable for other types of accounts to be restricted in how they can be spent. It would be desirable, for example, for a gift certificate account to be redeemable only at a restricted set of merchants. If the gift certificate account is a new payment account mechanism this restriction can be built into the protocol for redemption of the gift certificate. However, a gift certificate account may be based on a credit card network (e.g. Visa®) and credit card account numbering format (e.g., based on a Visa® card format). Although the giver of the gift certificate may wish that the recipient use the gift certificate at only certain merchants, if the gift certificate is based on the Visa® account number format there is typically nothing preventing the recipient from using the gift certificate anywhere that a Visa® card is accepted.

The invention described below addresses these disadvantages, providing restricted usage of payment accounts.

SUMMARY OF THE INVENTION

A method and system for restricting the usage of payment accounts is described herein.

According to one aspect, payment accounts maintained in an electronic wallet are restricted to being spent at only a particular set of one or more merchants. The set of merchants can be a static set, or alternatively a dynamic set with the merchants that belong to the set changing over time. When the user attempts to purchase goods and/or services at a merchant using a particular payment account, a check is made to verify that the restrictions on the payment account permit the user to make purchases at that merchant.

According to another aspect, restrictions limit the ability of funds to be transferred into payment accounts or transferred to other payment accounts. The payment account is limited so that funds can be added to (or withdrawn from) the payment account only from (or to) certain individuals. Such limitations prevent the user from transferring funds to particular other individuals, or receiving funds from particular other individuals (e.g., a parent may establish a child's payment account so that only the parent can add funds to it, not other individuals the child may encounter on the Internet).

According to another aspect, different payment accounts can be combined, thereby increasing the funds in one of the accounts (or creating a new payment account). When combining accounts, the restrictions on the newly created account (or account with increased funds) are a subset of the restrictions of the original accounts that were combined. In other words, the newly created account (or account with increased funds) can only be used in the same manner as both of the source accounts could have been used.

According to another aspect, merchant-specific payment accounts can be established and corresponding physical cards (e.g., credit cards or smart cards) issued to users. An account number is stored on the card along with restrictions that limit the card to being used only at the specific merchant. The new payment account information is also communicated to an account processing network so that subsequent use of the card can be verified. This system allows merchants to issue payment accounts (e.g., gift certificates or rebates) taking advantage of an account processing network managed by someone other than the merchant.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
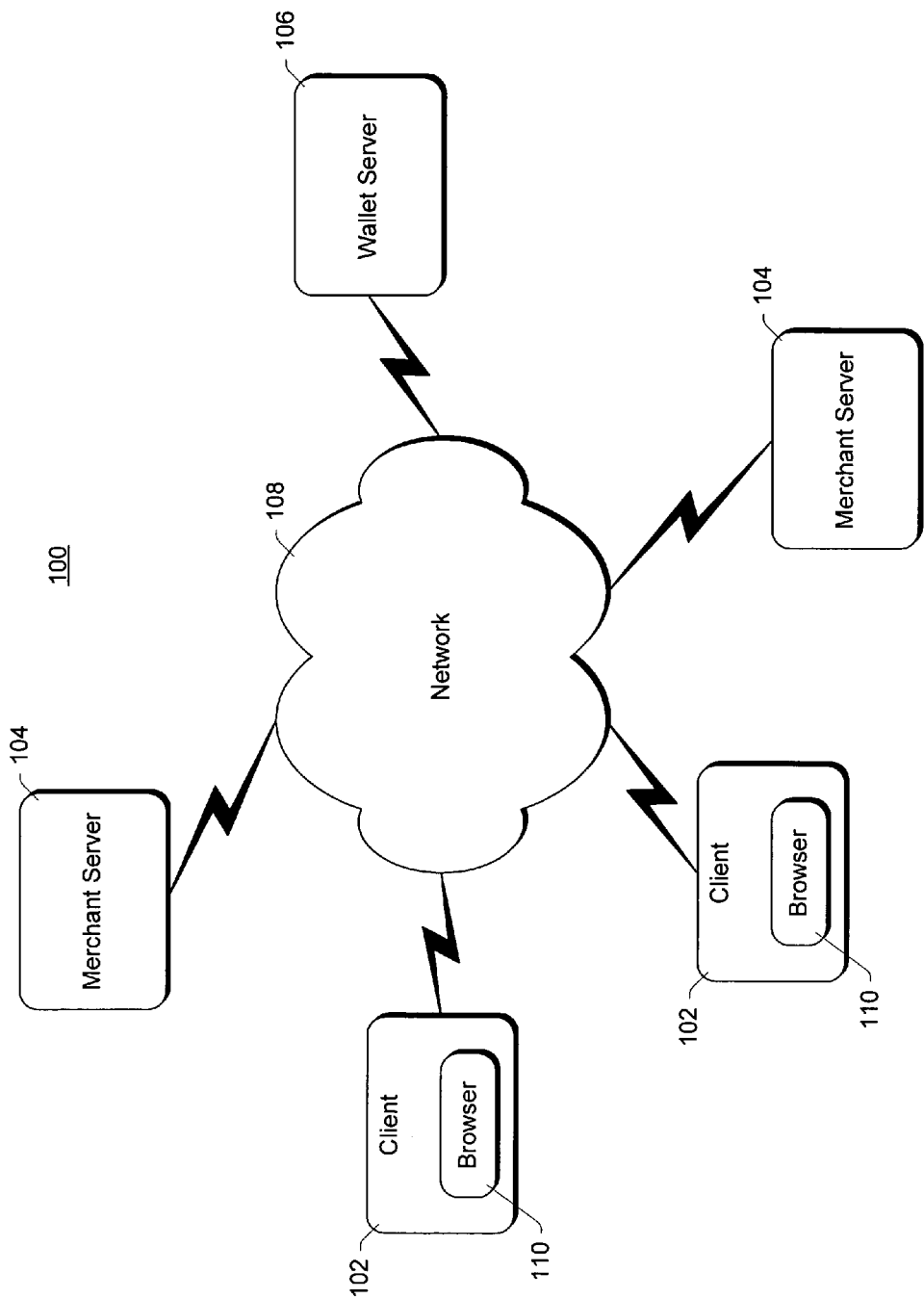
FIG. 1 is a block diagram illustrating an exemplary network environment such as may be used in accordance with certain embodiments of the invention.

FIG. 1 is a block diagram illustrating an exemplary network environment such as may be used in accordance with certain embodiments of the invention. In the network environment 100 of FIG. 1, multiple clients 102, multiple merchant servers 104, and a wallet server 106 are illustrated coupled together via a network 108. Network 108 represents any of a wide variety of wired and/or wireless networks, including public and/or private networks (such as the Internet, local area networks (LANs), wide area networks (WANs), etc.). Clients 102 and servers 104, 106 can be coupled to network 108 in any of a wide variety of conventional manners, such as wired or wireless modems, direct network connections, etc.

Clients 102 communicate with servers 104, 106 using one or more conventional protocols. In one implementation, network 108 is the Internet which supports the World Wide Web. The World Wide Web (also referred to as simply the "Web") is a collection of documents (referred to as "Web pages") that users can view or otherwise render and which typically include links to one or more other pages that the user can access. Information is communicated among clients 102 and servers 104 using, for example, the Hypertext Transfer Protocol (HTTP), although other protocols (either public or proprietary) could alternatively be used. Web pages are created in a markup language, such as the Hypertext Markup Language (HTML) or the eXtensible Markup Language (XML), although other languages could alternatively be used.

Wallet server 106 maintains an electronic "wallet" for each of multiple users of clients 102. Inside his or her electronic wallet, a user is able to store information regarding various accounts, some of which are traditional credit card accounts and others of which are referred to as "payment accounts". As used herein, a "payment account" refers to an account that has a monetary value associated with it (which may be changed), rather than a line of credit as is associated with traditional credit card accounts. The user is able, via a Web browser 110 running on a client 102, to use the payment accounts to make purchases on-line and also to manipulate the payment accounts. Such manipulation includes, for example, setting up new payment accounts, changing information in previously created payment accounts, adding funds to payment accounts, transferring value between payment accounts, etc.

During operation, Web browser 110 accesses a Web page hosted by a merchant server 104. A user is able, via Web browser 110, to purchase goods and/or services from the merchant via the Web page hosted by the merchant server 104. During the purchasing process, Web browser 110 receives, from wallet server 106, an indication of the accounts (including payment accounts and traditional credit card accounts) available to the user. Web browser 110 allows the user to select one of these available accounts to purchase the goods and/or services, and forwards payment information for the selected account to the merchant server 104.

Various restrictions can be imposed on the payment accounts during operation on a per-account basis. Such restrictions limit the ability of the user to spend funds from his or her account(s) and/or the ability of the user to receive additional funds into his or her pre-existing account(s). By so restricting the payment accounts, the accounts can be maintained in a centralized location for easy identification and access by the user, while at the same time allowing the user's ability to spend and/or receive funds from or to the different accounts to be limited.

Figure 2:
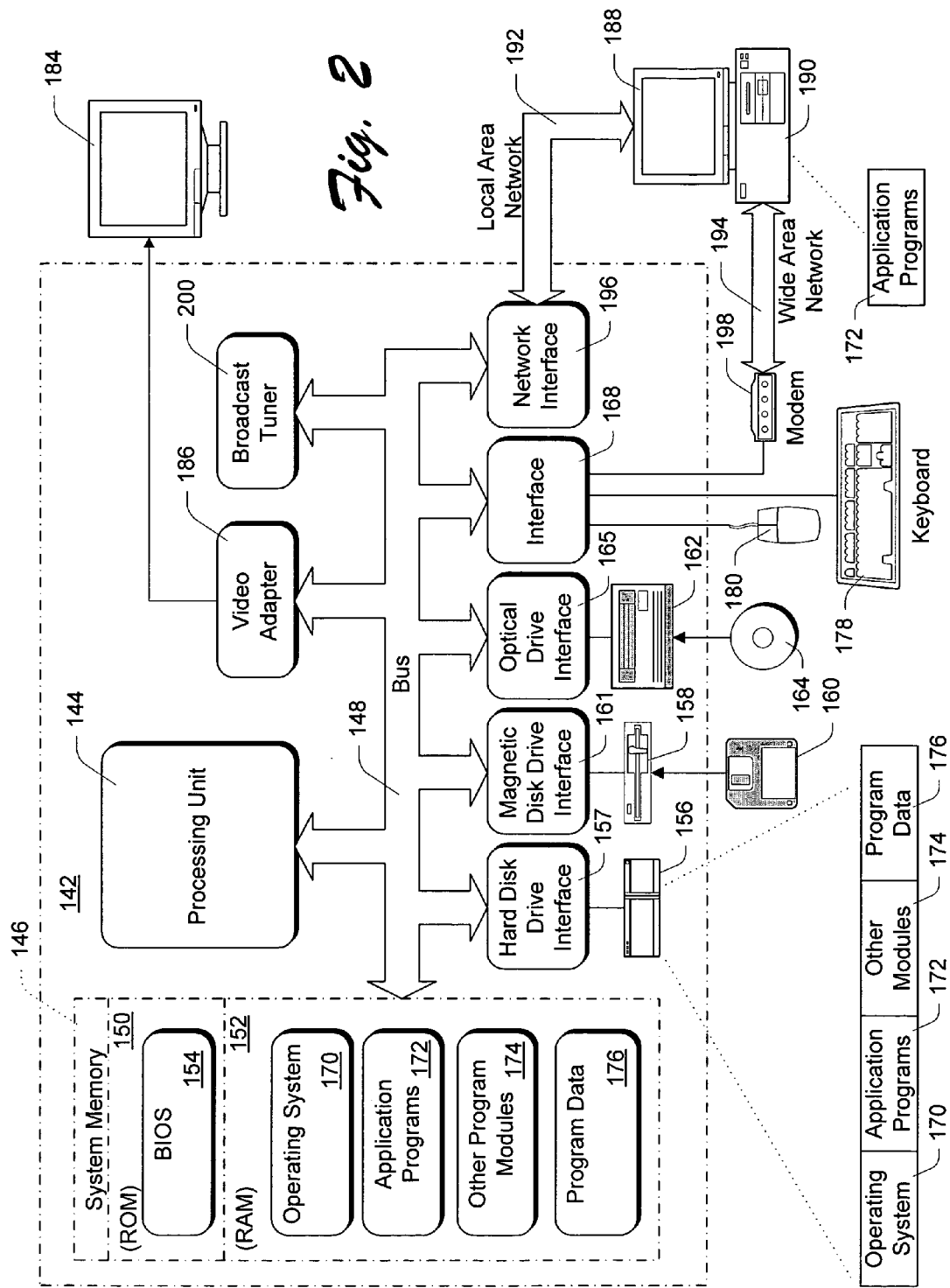
FIG. 2 illustrates an example of a suitable operating environment in which at least portions of the invention may be implemented.

FIG. 2 illustrates an example of a suitable operating environment in which at least portions of the invention may be implemented. The illustrated operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, public terminals or kiosks, wearable computers, network PCs, minicomputers, mainframe computers, distributed computing environments that include any of the above systems or devices, and the like.

Alternatively, the invention may be implemented in hardware or a combination of hardware, software, and/or firmware. For example, one or more application specific integrated circuits (ASICs) could be designed or programmed to carry out the invention.

FIG. 2 shows a general example of a computer 142 that can be used in accordance with the invention. Computer 142 is shown as an example of a computer that can perform the functions of a client 102 or server 104 or 106 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory 146 includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk drive interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from and/or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 that is coupled to the system bus (e.g., a serial port interface, a parallel port interface, a universal serial bus (USB) interface, etc.). A monitor 184 or other type of display device is also connected to the system bus 148 via an interface, such as a video adapter 186. In addition to the monitor, personal computers typically include other peripheral output devices (not shown) such as speakers and printers.

Computer 142 operates in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In certain embodiments of the invention, computer 142 executes an Internet Web browser program (which may optionally be integrated into the operating system 170) such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Computer 142 also includes a broadcast tuner 200. Broadcast tuner 200 receives broadcast signals either directly (e.g., analog or digital cable transmissions fed directly into tuner 200) or via a reception device (e.g., via antenna 110 or satellite dish 114 of FIG. 1).

Computer 142 typically includes at least some form of computer readable media. Computer readable media can be any available media that can be accessed by computer 142. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 142. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
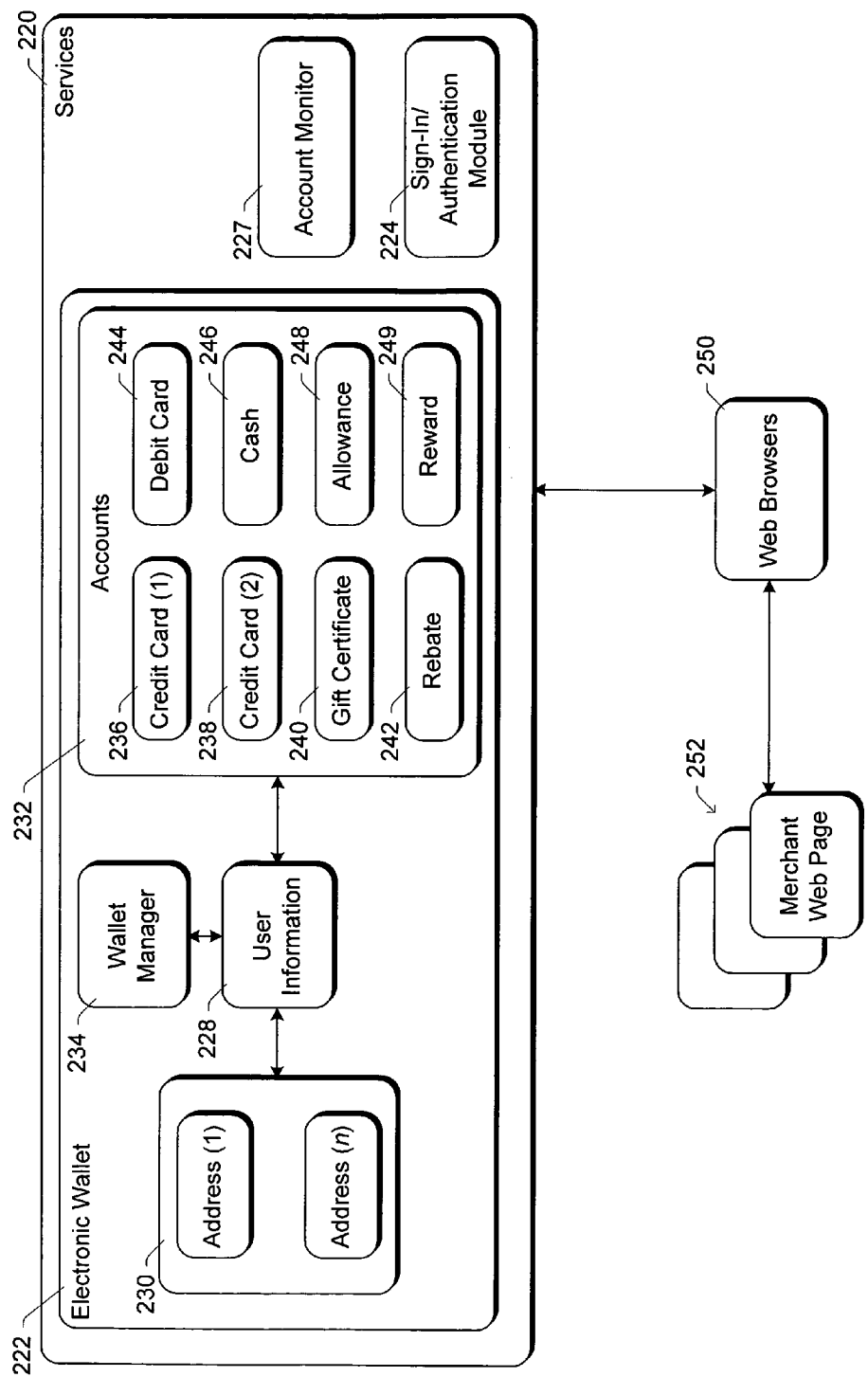
FIG. 3 illustrates an exemplary suite of services including an electronic wallet such as may be used in certain embodiments of the invention.

FIG. 3 illustrates an exemplary suite of services including an electronic wallet such as may be used in certain embodiments of the invention. The suite of services 220 includes an electronic wallet 222, an authentication module 224, and optionally an account monitor 227. The suite of services 220 may be made available to users from the same remote server (such as server 106 of FIG. 1) or alternatively different servers (for example, electronic wallet 222 may be made available from the first server while authentication module 224 is made available from another server).

In the illustrated example, a user first signs in or logs in to services 220 using his or her Web browser. This sign-in may be accomplished directly by the user accessing a Web page hosted by the server that provides services 220, or alternatively indirectly by the user accessing another Web page that redirects the user's Web browser to services 220. Sign-in is managed by authentication module 224, which verifies the identity of the user signing in. This verification can be performed in any of a wide variety of conventional manners, such as using a user ID and associated password, as well as any of numerous cryptographic and other techniques for authenticating the user. Once the user's identity is verified, the user is able to access the information maintained by services 220.

Electronic wallet 222 stores various purchasing and address information for a user. This stored information includes user identification information 228, address information 230, and information for multiple accounts (including both payment accounts and traditional credit card accounts) 232. User identification information 228 includes various information uniquely identifying the user electronic wallet 222 belongs to as well as information about the user's electronic wallet. Table I identifies the user identification information maintained in one exemplary implementation.

TABLE I

| Name | Description |
|---|---|
| MemberId | The user ID. |
| ProfileVersion | An incremental counter starting at 1 and incremented each time the electronic wallet is updated/modified. |
| CurrentAddress | The AddressID of one of the user's addresses. Often used as the default shipping address for purchased goods and/or services. |
| CurrentCard | The ID of one of the user's accounts, which can be a payment account or traditional credit card account. |

Address information 230 includes various addresses corresponding to the user. These addresses can include, for example, a home address, a business address, shipping addresses for the user or others (e.g., friends or family), a credit card billing address, etc. Table II identifies the information maintained for each address in one exemplary implementation.

TABLE II

| Name | Description |
|---|---|
| AddressID | Unique (for the user) identifier of the address. |
| MemberId | The user ID. |
| Fname | First name of person for address. |
| Lname | Last name of person for address. |
| Addr1 | First line of address (e.g., to include company or street name). |
| Addr2 | Second line of address (e.g., to include street name or apartment number). |
| City | City for address. |
| State | State for address. |
| PostalCode | Postal code for address. |
| Country | Country for address. |
| Phone | Phone number corresponding to address. |
| Email | Email corresponding to address (could be the user, the person identified in Fname and Lname fields, or someone else). |
| FriendlyName | User-friendly identifier of the address (e.g., "Home", "Mom's Address", etc.). |

Multiple accounts 232 are illustrated with the electronic wallet 222. In the illustrated example, two credit cards 236, 238, a gift certificate 240, a rebate account 242, a debit card 244, a cash account 246, an allowance account 248, and a reward account 249 are shown. It is to be appreciated that these accounts illustrated are exemplary only, and alternatively more or fewer accounts could be included in electronic wallet 222. Additionally, other types of accounts (not shown), such as Micro Payment accounts, may also be included in electronic wallet 222. Credit card accounts are accounts that correspond to the user's physical credit cards. Gift certificate payment accounts are accounts that correspond to electronic gift certificates that have been given (or otherwise transferred) to the user. Rebate payment accounts are accounts that correspond to electronic rebates that have been given (or otherwise transferred) to the user, such as in response to the user's purchase of a particular product. Reward payment accounts are accounts that correspond to rewards that have been given to the user in exchange for certain behavior (e.g., accessing certain web sites, making donations, being a long-term customer, registering a product within a certain period of time, etc.). Debit card payment accounts are accounts that correspond to the user's physical debit cards (e.g., as issued by a bank). Cash payment accounts are accounts that are analogous to physical cash carried by the user. Cash payment accounts are similar to debit card payment accounts in that they have a limited amount of funds associated with them and do not involve issuance of credit to the user. Allowance payment accounts are a special type of cash or debit card payment account that are designed to be given to children (with the advantage of restricting the usage of the account)

Different types of accounts (e.g., credit cards, debit cards, gift certificates, rebates, rewards, cash, allowance, etc.) can be included in electronic wallet 222, as well as multiple accounts of the same type. Each of the different types of accounts is presented differently to the user, allowing him or her to easily distinguish between accounts. In some instances, logos corresponding to the account type (e.g., Visa®) or the issuer (e.g., the bank name) may be displayed to the user. However, even though the different account types are presented to the user differently, the different account types may share an underlying format. For example, gift certificates may use the same account numbering scheme as is used for Visa® cards.

Each of the accounts 232 includes payment information for the account. This payment information includes information that is passed to a merchant server to allow the user to purchase goods and/or services from a merchant. Table III identifies the information maintained for each account 232 in one exemplary implementation. Note, however, that not all accounts need include all of this information, and other accounts may include additional information.

TABLE III

| Name | Description |
|---|---|
| ID | Unique (for the user) identifier of the account. |
| MemberId | The user ID. |
| Type | An identifier of the type of account. |
| Num | An account number for the account. For credit cards, the credit card number. |
| Num2 | A secondary number for identifying the card. For Visa cards this could be the CVV2 (Card Verification Value 2). |
| Exp | An expiration date of the account. |
| BillingAddress | The AddressID of one of the address in the Addresses table. |
| Name | The name on the account. |
| FriendlyName | A user-friendly identifier of the account (e.g., "Joe's Visa", "Gift Certificate From Mom", "Rebate from Microsoft ®"). |
| Restrictions | Restrictions associated with the payment account (e.g., where funds corresponding to the payment account can be spent or where new funds to be added to the payment account can be received from). |

Services 220 can be accessed by client Web browsers 250 for a variety of different purposes. A user may access services 220 directly, such as to modify information in electronic wallet 222 (e.g., add a new payment account, change an address, etc.). Modifications to electronic wallet 222 may also be made by others, as discussed in more detail below. A wallet manager 234 transmits web pages to browser 250 with options allowing a user to add, delete, and modify accounts 232 and addresses 230. A user may also access services 220 indirectly, such as when making a purchase of goods or services from a merchant Web page 252. During the purchasing process, Web browser 250 acts as an intermediary between the merchant Web page 252 and electronic wallet 222, as discussed in more detail below.

When included in services 222, account monitor 227 monitors the usage of payment accounts within accounts 232 and prevents transactions if the restrictions on a payment account are violated. In one implementation, transactions involving the transfer of funds to and/or from payment accounts are passed through account monitor 227 prior to being returned to the requesting web browser 250. Account monitor 227 compares the identity of the recipient of funds from a payment account (or alternatively the source of funds for a payment account) to the restrictions associated with the payment account. If the restrictions indicate that the recipient (or source) is acceptable, then account monitor 227 allows the transfer to continue. However, if the restrictions indicate that the recipient (or source) is unacceptable, then account monitor 227 prohibits the transfer. Account monitor 227 can prohibit the transfer in any of a variety of manners, such as simply returning an indication to web browser 250 that the transaction cannot be completed.

Different types of restrictions can be imposed by the account monitor on payment accounts on a per-payment account basis, limiting the user's ability to spend the funds from payment accounts (or receive additional funds into payment accounts). Restrictions on payment accounts can be classified into two general types: merchant usage restrictions and payment account transfer restrictions. Merchant usage restrictions refer to restrictions on where the user is able to spend the funds in the payment account. Payment account transfer restrictions refer to restrictions, for a particular payment account, on what other payment accounts the user can receive funds from and/or transfer funds to.

Merchant usage restrictions limit where (e.g., based on the identity of the merchant(s)) the user is able to spend funds associated with the payment account. The payment account can be restricted to being spent at only a set of one or more merchants. Which merchants the payment account can be spent at is identified when the payment account is established. For example, if a mother is giving her son a gift certificate payment account, then the mother can identify, during the process of purchasing the gift certificate, which on-line merchant(s) the gift certificate funds can be spent at. The set of one or more merchants can be a static set or a dynamic set that changes over time. By way of example, the payment account may identify a static set of merchants (e.g., by name, numeric identifier, by Internet address, etc.) that funds associated with the account can be spent at. Alternatively, the payment account may identify a particular group of merchants (e.g., those corresponding to a particular on-line community, such as an on-line shopping mall). An example of such a group of merchants are the MSN® Shopping merchants accessible via the MSN® Web site. The actual merchants within the group may change over time, and the restriction imposed on the payment account is checked when funds for the payment account are to be spent—if the merchant where funds are to be spent is part of the group at the time the funds are to be spent, then the purchase is allowed; otherwise, the purchase is not allowed, even if the merchant were a part of the group when the payment account was created.

Merchant usage restrictions can further limit the user's ability to use the payment account off-line. For example, the restrictions may indicate whether a physical card (e.g., analogous to a credit card or smart card) can be issued to the user. If such a physical card can be issued to the user, then the user is able to spend the funds from the payment account in a traditional off-line manner using the physical card. The restrictions may also indicate whether the user can obtain "cash" from the account, including cash in-hand, transfer to a checking or savings account, etc. (e.g., if a physical card is issued to the user, whether the physical card can be used at an automated teller machine (ATM) for the user to directly withdraw funds from the payment account).

Payment account transfer restrictions limit the ability of the user to transfer funds from (or receive funds in to) one of his or her payment accounts to (or from) the payment account of another. A payment account may be restricted to transferring funds to only one or more other users (e.g., identified by some unique identifier such as an email address). A payment account may similarly be restricted to receiving funds from only one or more other users. For example, an allowance payment account used by a child may be limited to receiving funds only from the child's parents.

The restrictions on payment accounts also limit the user's ability to Combine funds from multiple ones of his or her payment accounts. By way of example, assume that a user has two $50 gift certificates: one is restricted to being spent only at Merchants A, B, and C, while the other is restricted to being spent only at Merchants C, D, and E. If the user desires to make a $100 purchase at Merchant C, then the user can combine both gift certificates for the purchase (because both certificates are useable at Merchant C). This would also entail either creating a new gift certificate account that is redeemable only at Merchant C, or alternatively modifying the restrictions on the account the two are combined into to being redeemable only at Merchant C. However, if the user desires to make a $100 purchase at any one of Merchants A, B, D, or E, then the user is limited to using only one of the $50 gift certificates (having to come up with the remaining $50 from some other source).

Each payment account may also have an expiration date associated with it. Once the expiration date has passed, the payment account is no longer valid and cannot be used for purchases (the expiration date is compared to the current date at the time the funds are trying to be spent, and authorization to spend the funds fails if the expiration date has passed). If two payment accounts are combined, then the resultant combination is also limited by the earliest expiration date of the two accounts (if any). Following the previous example, assume that one of the $50 gift certificates has an expiration date of Jan. 1, 1999 and the other has an expiration date of Jun. 1, 1999. The newly created $100 gift certificate (whether a new account or one of the original accounts with new funds added to it) would then have an expiration date of Jan. 1, 1999.

The combination of funds into a payment account occurs prior to purchase, and may be just before the purchase (e.g., when the user checks out at an on-line merchant) or alternatively a substantial period of time prior to the purchase (e.g., weeks or months). If funds from multiple source payment accounts are to be combined, then either a new payment account is created or the funds available on one of the source payment accounts is increased (and the funds on the other source payment account decreased). Regardless of whether a new payment account is created or a pre-existing payment account is modified, the payment account that the funds are transferred to has restrictions that satisfy the restrictions of both source payment accounts. By way of example, assume that a user has two $50 gift certificates that he desires to combine into a single gift certificate: the first gift certificate is restricted to being spent only at Merchants A, B, and C, while the second gift certificate is restricted to being spent only at Merchants C, D, and E. If funds from the second gift certificate (either all or a portion of the funds) are to be transferred to the first gift certificate, then the restrictions on the first gift certificate are changed so that the first gift certificate is restricted to being spent only at Merchant C (or a new gift certificate is created that is restricted to being spent only at Merchant C).

The combination of payment accounts and creation of new restrictions may be a reversible or irreversible process. For instance, once funds from the second gift certificate in the previous example are added to the first gift certificate, the restriction changes on the first gift certificate may be irreversible (the funds from the first gift certificate will always be limited to being spent at Merchant C—no purchases form Merchants A or B can be made with the funds). Alternatively, the device performing the combining (e.g., wallet manager 234) may maintain a record of what combinations were made and allow them to be later reversed or "un-done" by the user. Additional limitations may be made on such reversals, such as allowing the reversal only if no funds from the combined account have been spent since the combination.

In addition to combining payment accounts, a single payment account may also be separated or "split" into multiple payment accounts. For example, a $100 gift certificate may be separated into one $50 gift certificate and two $25 gift certificates. Each of the newly created payment accounts is restricted to being spent at the same merchants as the original payment account, and the expiration date of each of the newly created payment accounts is the same as the original payment account. Analogous to the combining of payment accounts, the splitting of payment accounts may be a reversible or irreversible process.

Electronic wallet 222 further provides a centralized location at which a user can store all of the information necessary to make purchases on-line. The user can have multiple different types of payment accounts in his or her wallet and have them readily accessible regardless of their source. For example, the user need not remember what gift certificates and/or rebates he or she has received, but simply access his or her electronic wallet to identify the available gift certificates and rebates. Additionally, using the centralized storage of accounts 232 and addresses 230, a user is able to simply select from already-entered data to make purchases at a wide variety of on-line merchants, thereby reducing the amount of data entry required by the user and reducing the chances of errors in entering the information at numerous locations.

Figure 4:
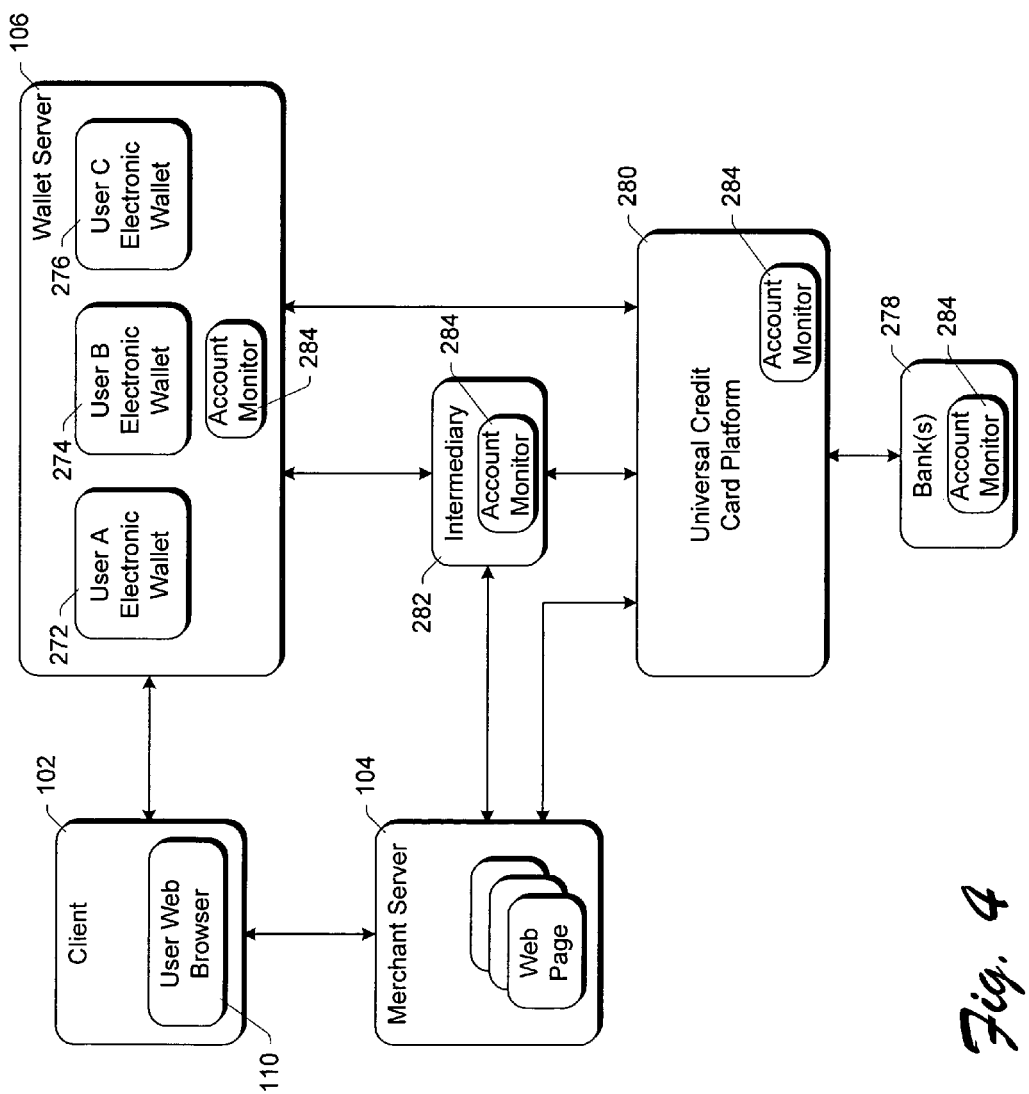
FIG. 4 is a block diagram illustrating an exemplary environment in which purchases of goods and/or services can be made using an electronic wallet.

FIG. 4 is a block diagram illustrating an exemplary environment in which purchases of goods and/or services can be made using an electronic wallet. The user of a client 102, via a Web browser 110 running on client 102, can access both a merchant server 104 and wallet server 106. Wallet server 106 includes multiple electronic wallets 272, 274, and 276, each corresponding to a different user. The user can manipulate funds in his or her wallet, and has no access to wallets of other users stored on wallet server 106.

A user can receive funds into, or spend funds from, any of the accounts identified in his or her electronic wallet (subject to any restrictions on the payment accounts). The receipt or expenditure of funds can be performed directly from wallet server 106 (e.g., a user transferring funds from one of his or her payment account accounts to the account of another user), or indirectly from wallet server 106 (e.g., via a merchant server 104). It should be noted, however, that the payment accounts within an electronic wallet only identify accounts and money that the user has access to—the payment accounts do not actually store money themselves. For example, a debit card payment account may store a debit card number and corresponding expiration date. However, the actual money for the account (the funds that the user has access to using that debit card) is maintained by the bank (or other issuer) of the debit card.

When funds are being transferred from a payment account to a merchant (e.g., being spent), the identification information stored in the electronic wallet for the payment account (e.g., account number, fraud protection number (if any), expiration date (if any), and billing address (if any)) is transferred first to the merchant and then from the merchant to the issuing bank (or agent thereof) 278. This first transfer (to the merchant) can be simply done through an HTTP POST from the wallet server to the merchant server. This second transfer (to the issuing bank) is typically performed by communicating the information to a universal credit card platform or network 280, such as that provided by First Data Corp. (FDC) of Atlanta, Ga. The universal credit card platform 280 verifies the integrity of the account number and the funds available, and reports the information to the requester (e.g., merchant server 104). Account number integrity can be verified in any of a wide variety of conventional manners. Alternatively, rather than communicating directly with the platform 280, the requester may communicate with platform 280 via an intermediary 282. Intermediary 282 may, for example, receive information for multiple purchases and combine them for submission to platform 280 as a group.

Note that certain account types (e.g., gift certificates payment accounts) might not be backed by a traditional bank or credit card. A simple account and account balance might be maintained in such situations (e.g., at wallet server 106 or another device), although the principles of spending it are the same as above.

Funds can be transferred into a payment account from other accounts in the same electronic wallet (e.g., combining accounts), or alternatively from external sources. To receive funds into a payment account, wallet manager 234 receives an indication of the payment account the funds are to be transferred into and verifies the availability of the funds (e.g., via intermediary 282 or universal credit card platform 280), analogous to the merchant's verification of find availability discussed above. Assuming the desired finds are available (and the addition of funds to the payment account is not restricted), the wallet server adds the funds to the indicated payment account by forwarding an indication of the desired funds to the appropriate payment account issuer (e.g., via intermediary 282 or universal credit card platform 280), or by updating the appropriate indication in the electronic wallet (e.g., if the electronic wallet holds the funds). Similarly, the wallet server removes the funds from the source account by forwarding an indication of the removal (or other charge) to the appropriate source account issuer (e.g., via intermediary 282 or universal credit card platform 280).

Additionally, payment accounts can be added to an electronic wallet 222 by the user that corresponds to the wallet 222 or alternatively another user. For example, a user may desire to enter information for a new payment account, such as a new debit card he or she recently received. The user signs-in to his or her electronic wallet 222 via authentication module 224 and adds the information for the new payment account via an interface (e.g., web pages) presented by wallet manager 234.

Additionally, users may add payment accounts to other users' electronic wallets either directly or indirectly. To directly add a payment account to another user's electronic wallet (e.g., a new allowance account or an increase in the amount of funds in an allowance account), the user signs in to his or her own electronic wallet, and then identifies, via wallet manager 234, the other user that the new payment account is to be added to. Such additions may be automatic, or alternatively the other user may be prompted (e.g., the next time he or she signs-in to his or her account) to approve the receipt. To indirectly add a payment account to another user's account (e.g., a gift certificate or rebate), the user operates through an intermediary (such as an electronic mail system). The intermediary forwards an indication (e.g., an email message) to the user of the new payment account. The user can either copy information from the email message himself or herself to create the new payment account, or alternatively select a link embedded in the email message. Selection of the email message causes the source of the new payment account (e.g., a gift certificate or rebate portal) to communicate with the wallet manager 234, identifying the user that the new payment account is to be added for.

An account monitor 284 can be implemented in any one or more of wallet server 106, intermediary 282, universal credit card platform 280, and or a bank 278. Account monitor 284 monitors the fund transfers for accounts maintained in electronic wallets 272, 274, and 276, and verifies that the restrictions (if any) imposed on such accounts are not being violated. If the restrictions are not being violated, then the fund transfer is permitted and allowed to proceed; however, if restrictions are being violated, then the fund transfer is denied and not allowed to proceed. For example, if user B is attempting to spend funds from a gift certificate payment account at Merchant A but the gift certificate payment account is restricted to being spent only at Merchant D or Merchant E, then when the attempted purchase is made account monitor 284 denies the purchase. When account monitor 284 is implemented in intermediary 282, platform 280, or bank 278, the denial of a find transfer can be indicated back to merchant server 104 (or wallet server 106) with specific information as to why the transfer was denied (e.g., an indication that restrictions were violated), or alternatively without such specific information (e.g., simply indicating that the account cannot be verified for the desired fund transfer).

Figure 5:
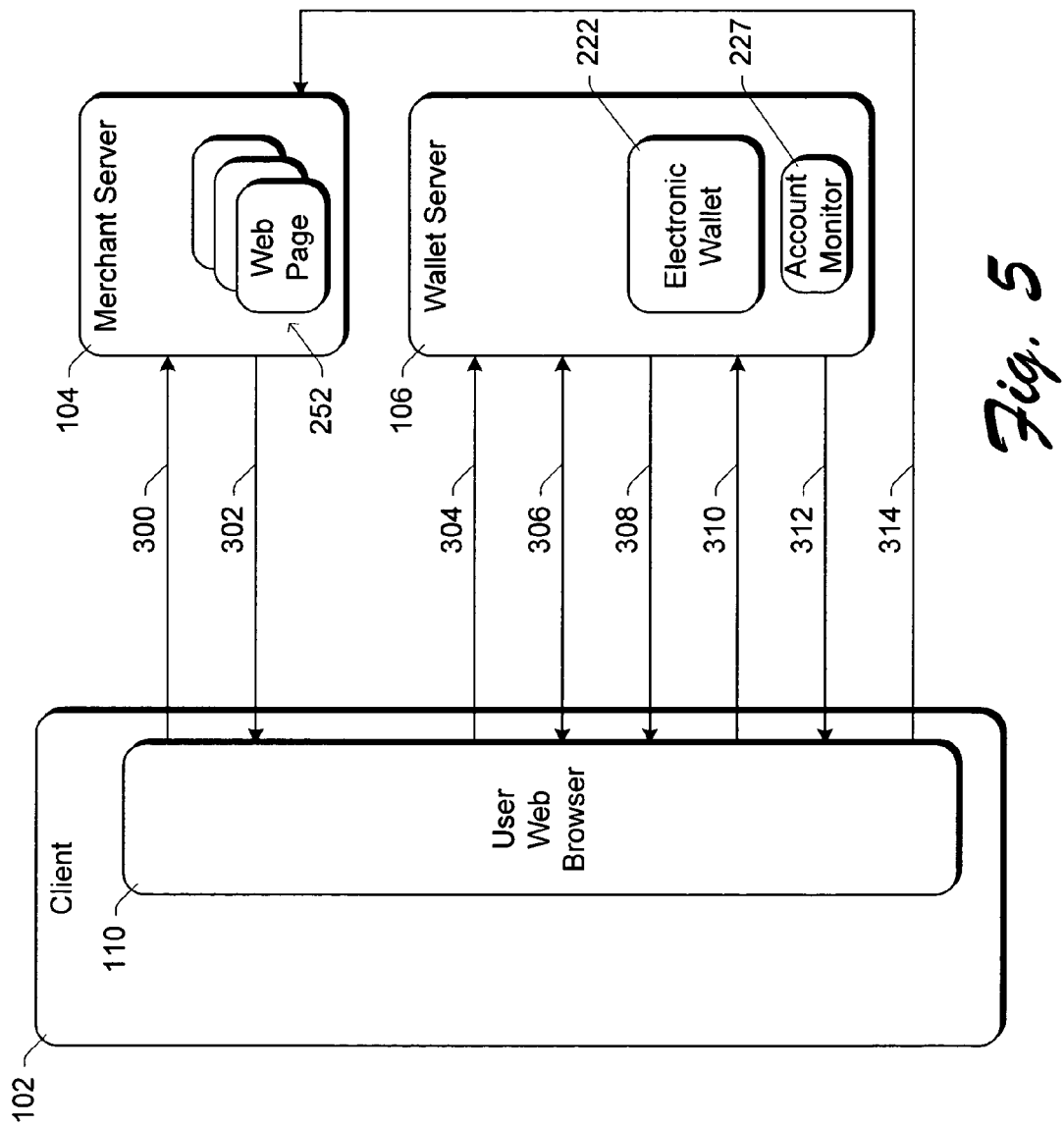
FIG. 5 is a block diagram illustrating an exemplary data flow when making a purchase from a merchant Web page using an electronic wallet in accordance with certain embodiments of the invention.

FIG. 5 is a block diagram illustrating an exemplary data flow when making a purchase from a merchant Web page using an electronic wallet in accordance with certain embodiments of the invention. A user browses or "surfs" the Internet via a browser 110 executing on a client 102. The user accesses one or more Web pages 252 at a merchant server(s) that identify goods and/or services that the user desires to purchase. The user selects these goods and/or services (act 300) in a conventional manner via browser 110. When the goods and/or services are selected, merchant server 104 displays a product purchase Web page 252 that includes a link to electronic wallet 222 (act 302). The product purchase Web page 252 typically displays the products and/or services to the user and gives him or her the option to purchase the displayed products and/or services by selecting the link to electronic wallet 222. Often times, these product purchase Web pages are referred to as "checkout" or "shopping cart" pages.

The user then selects (e.g., "clicks on") the link to the electronic wallet 222, which causes browser 110 to access wallet server 106 (act 304). Various information can be embedded in the link to the electronic wallet (e.g., included as parameters of a URL corresponding to wallet server 106). The amount of the user's desired purchase may also be embedded in the link. Table IV identifies the information embedded in the link to the electronic wallet in one exemplary implementation.

TABLE IV

| Argument | Description |
| --- | --- |
| Partner ID | An identifier of the merchant site. |
| Language Code ID | Specifies the language to display the wallet pages in. |
| Return URL | URL that the wallet server should return to after user selections are made. |
| Data Requested | Identifies what data is requested by merchant server: e.g., shipping address only, account information only (including billing address, if any), or both shipping address and account information (with billing address). Allows only appropriate options to be presented to the user on the wallet page (e.g., account information is not displayed for user selection if the merchant only requests the shipping address). |
| Cards | List of accounts that are acceptable to the merchant. |
| Preferred Card | Identifies a preferred type of account, allowing the wallet page to include a logo or other identifier of the preferred type of account (either a traditional credit card account or a payment account). |

The response by wallet server 106 varies, depending on whether the user of client 102 is already logged in to his or her wallet. If the user has not logged in to his or her wallet yet, then wallet server 106 connects browser 110 to a sign-in/authentication module (module 224 of FIG. 3). Authentication module 224 authenticates the user (act 306), associating the user of browser 110 with the correct electronic wallet 222. This allows the correct one of multiple electronic wallets stored at server 106 (that is, the electronic wallet that includes the user's information) to be associated with the user of browser 110. Once the user is logged in, a wallet page that includes the contents (or references to the contents) of the user's electronic wallet 222 can be displayed to him or her (act 308). If, on the other hand, the user is already logged in to his or her wallet, then the wallet page can be displayed to the user (act 308) without making the user repeat the sign-in process.

The wallet page displays to the user various information from his or her electronic wallet 222. This information includes, for example, different accounts 232 from which the user can select to make his or her purchases, different shipping addresses where the purchased goods are to be delivered (or purchased services to be performed), different billing addresses that correspond to different accounts 232, etc. These different options can be displayed to the user in a wide variety of different manners, such as the use of drop-down or pull-down menus, selection boxes with multiple entries (and optionally scroll bars), a radio button corresponding to each selectable option, etc. In one implementation the billing address is tied to the account, so selection of a new account automatically results in selection of the appropriate billing address. The available options are controlled by the merchant calling the wallet. For example, payment accounts not valid at the merchant might not be displayed, or alternatively displayed but disabled. Additionally, the specification of shipping address may be optional, as some merchants do not require this (they do not need it or do not allow it to be different than a billing address on a credit card).

Whatever options are selected by the user, their selection is forwarded to wallet server 106 (act 310). Based on these selections, wallet server 106 accesses electronic wallet 222 to obtain the purchase information for the selected account and address information for the purchase (e.g., shipping address and billing address for the account). This purchase information can include, for example, all necessary information to use the identified account (e.g., in the case of an account that is a credit card, the necessary information may include a billing address and credit card number). Some of this information (e.g., a credit card number) may not have been initially transferred to browser 110 (e.g., an indication of "My Visa" may have been sent in act 308, but not the actual credit card number).

Wallet server 106 transfers this purchase information and address information to browser 110 (act 312). This transfer is accomplished via an HTML GET command, with at least some of the purchase and address information (e.g., the account number and expiration date) in hidden form fields. Upon receipt, browser 110 issues an HTTPS (HTTP over SSL) POST to the merchant web page (as indicated by the ReturnURL parameter in table IV), which forwards the purchase and address information to merchant server 104 (act 314). Merchant server 104 then has the necessary information to charge the purchase to the appropriate account, allowing the merchant to be paid and the user to receive the purchased goods and/or services. In one exemplary implementation, the purchase and address information is transferred from browser 110 to merchant server 104 in accordance with the well-known Electronic Commerce Modeling Language (ECML).

Given the purchase and address information, merchant server 104 verifies that the desired purchase can be made. Merchant server 104 validates the funds through a bank (e.g., bank 278 of FIG. 4) or a protocol specific to the account type being used to make the purchase. For example, for a Visa® account FDC could be used, while for other accounts the protocol may be a proprietary protocol. By way of another example, for a gift certificate payment account that conforms to the Visa® card format (or is convertible to the Visa® card format), the payment account would be validated through FDC, which communicates with a particular bank on the back end that validates the funds for the payment account and enforces any restrictions on the payment account.

Various security measures can optionally be implemented within the process illustrated in FIG. 5 to maintain the security of confidential user information. Examples of such security measures include establishing secure links between client 102 and server 104 and/or server 106 (e.g., using the HTTPS protocol), and encrypting information being passed.

In the illustrated example, wallet server 106 does not store an indication of funds in the various payment accounts of a user's electronic wallet. Rather, if such information is needed (e.g., to display to the user the funds still available to him or her from a gift certificate) then wallet server 106 communicates with the issuer of the account (e.g., via universal credit card platform 280) to obtain a current balance available in the account. Alternatively, indications of funds available in one or more payment accounts may be stored in the user's electronic wallet. For example, the value of a rebate payment account may be stored in the electronic wallet, and updated when the user spends a portion (or all) of the funds.

In situations where an identification of funds are stored in the user's electronic wallet, then any transfers between accounts are accomplished by updating the appropriate payment account balances in the electronic wallet. However, in situations where an external entity needs to be made aware of the transfer (e.g., the account issuer), then the account issuer is contacted to verify the availability of funds to be transferred (e.g., via intermediary 282 or platform 280 of FIG. 4). If sufficient funds are available, then the appropriate charge is communicated to the issuer of the source account and the appropriate addition is communicated to the issuer of the destination account.

Wallet server 106 may also map one type of account to another type of account. This mapping allows payment accounts to maintain their original identity in the eyes of the user while at the same time allowing them to be viewed differently by a merchant. By way of example, a gift certificate may be given to a user. The gift certificate includes purchasing information in the Visa® credit card format (or alternatively in a format that can be converted to the Visa® credit card format). When the user accesses his or her wallet, he or she sees the gift certificate as a gift certificate payment account—any association that the payment account has with a Visa® card (or the Visa® card format) is hidden from the user. However, when a purchase is made, wallet server 106 communicates the purchase information for the gift certificate payment account to the merchant server as if the purchase information were from a Visa® card. Any representation of the payment account to the user as a gift certificate is thus hidden from the merchant. This has the advantage of allowing the merchant to accept the payment without doing any special work to accept a new payment account for purchase.

A user is able to maintain multiple different accounts in his or her electronic wallet, and these accounts can be of the same or different types. Not all merchants, however, may accept all of these different types of accounts. By way of example, a user may store in his or her wallet two credit card accounts (one for a Visa® card and one for an American Express® card) as well as a gift certificate payment account. Although illustrated to the user as a gift certificate, the gift certificate payment account may be of a format that can be converted to a Visa® card format. A particular merchant (at which the gift certificate is redeemable), on the other hand, may only accept the Visa® credit card for purchases. In this example, the wallet server would thus include on the wallet page the Visa® card account and the gift certificate payment account. The American Express® card account would not be displayed because it is not useable by the user at that merchant (and cannot be converted to a useable format). Alternatively, the non-useable account(s) may be displayed to the user but displayed in a manner that indicates that it is not useable (for example, it may be presented in a different font or different color, or in a separate section identified as "not useable").

In the discussion above, various actions are described as being performed at the wallet server. For example, conversions between account formats are performed at the wallet server, purchase information for the accounts selected by the user is retrieved in response to user selections, etc. Alternatively, some or all of these actions may be carried out at the client (e.g., an applet executing in browser 110 or other application executing on the client).

Figure 6:
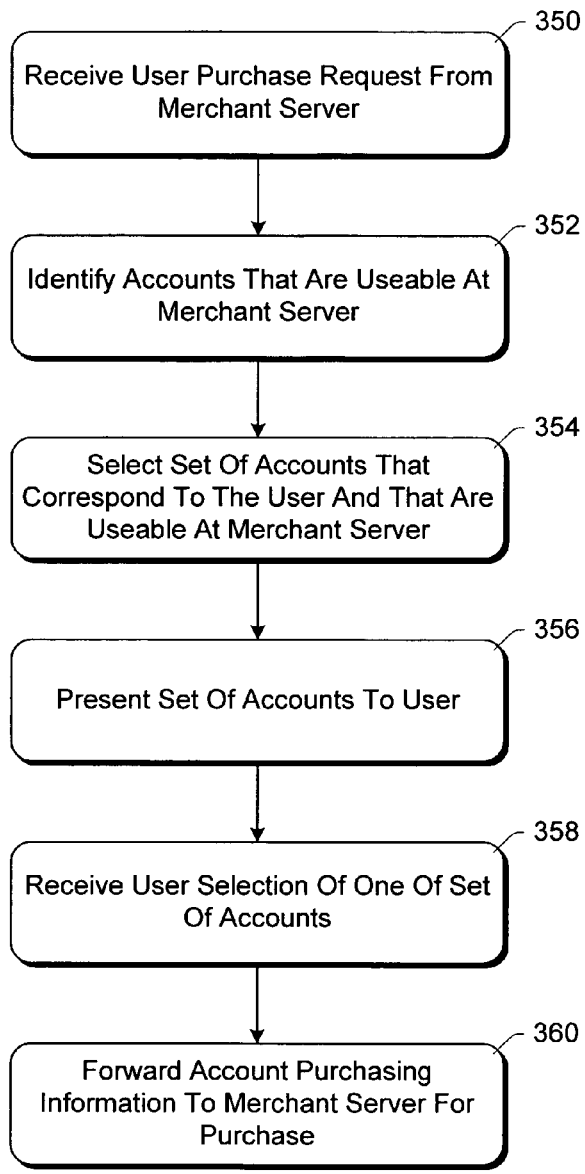
FIG. 6 is a flowchart illustrating an exemplary process for displaying accounts useable for a purchase in accordance with certain embodiments of the invention.

FIG. 6 is a flowchart illustrating an exemplary process for displaying accounts useable for a purchase in accordance with certain embodiments of the invention. The process of FIG. 6 is implemented by browser 110 and wallet server 106, and may be implemented in software.

Initially, a request for a user purchase is received from a merchant server (act 350). The accounts that are useable at that merchant are then identified (act 352). These accounts can be identified in any of a wide variety of manners (e.g., the merchant may pre-register with the wallet server with the accounts, the request received in act 350 may include them, etc.). The wallet server then selects a set of accounts corresponding to the user that are useable at the merchant server (act 354). This set includes those accounts of a type that the merchant identified as being useable, as well as those that are of a type that can be converted to a format that is compatible with any one or more of those identified as being useable by the merchant.

The set of accounts corresponding to the user that are useable at the merchant server may optionally be further limited in act 352 based on the restrictions on the payment accounts corresponding to the user. To limit the set of accounts based on such restrictions, the wallet server communicates with an account monitor (either implemented at the wallet server or elsewhere) to determine whether the desired purchase would violate any of the restrictions associated with the payment accounts corresponding to the user. If the purchase would violate the restrictions of a particular one or more payment accounts, then those payment accounts are not included in the selected set of accounts that are useable at the merchant server.

The set of selected accounts is then presented (e.g., displayed) to the user (act 356). The wallet server then receives a user selection of one of the accounts in the set (act 358) and forwards the account purchasing information for that account to the merchant server (act 360). This forwarding may be direct, or alternatively via a Web browser.

Figure 7:
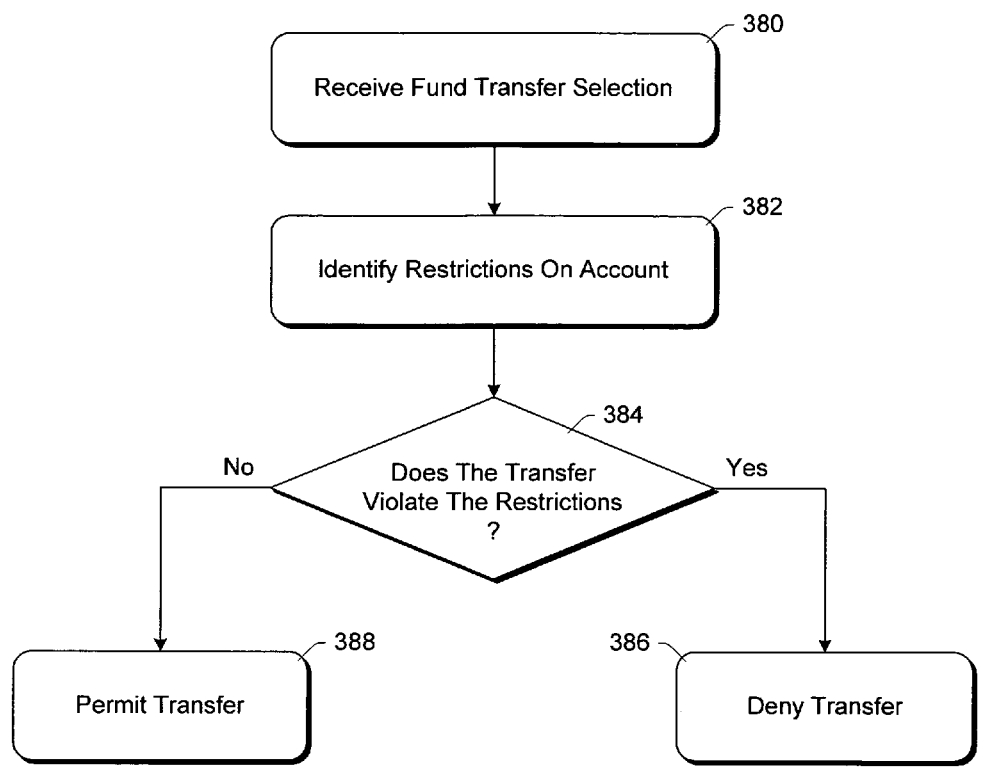
FIG. 7 is a flowchart illustrating an exemplary process for imposing restrictions on payment accounts in accordance with certain embodiments of the invention.

FIG. 7 is a flowchart illustrating an exemplary process for imposing restrictions on payment accounts in accordance with certain embodiments of the invention. The process of FIG. 7 is implemented by an account monitor 284 of FIG. 4, and may be implemented in software.

Initially, a fund transfer selection is received (act 380). The fund transfer selection can be in response to a request to purchase goods and/or services from a merchant, combine funds from multiple payment accounts, receive funds into payment account, etc. Upon receipt of the selection, the account monitor identifies any restrictions on the payment account (act 382) and determines whether the transfer would violate any of those restrictions (act 384). If the transfer would violate any of those restrictions then the transfer is denied (act 386); otherwise, the transfer is permitted (act 388).

Figure 8:
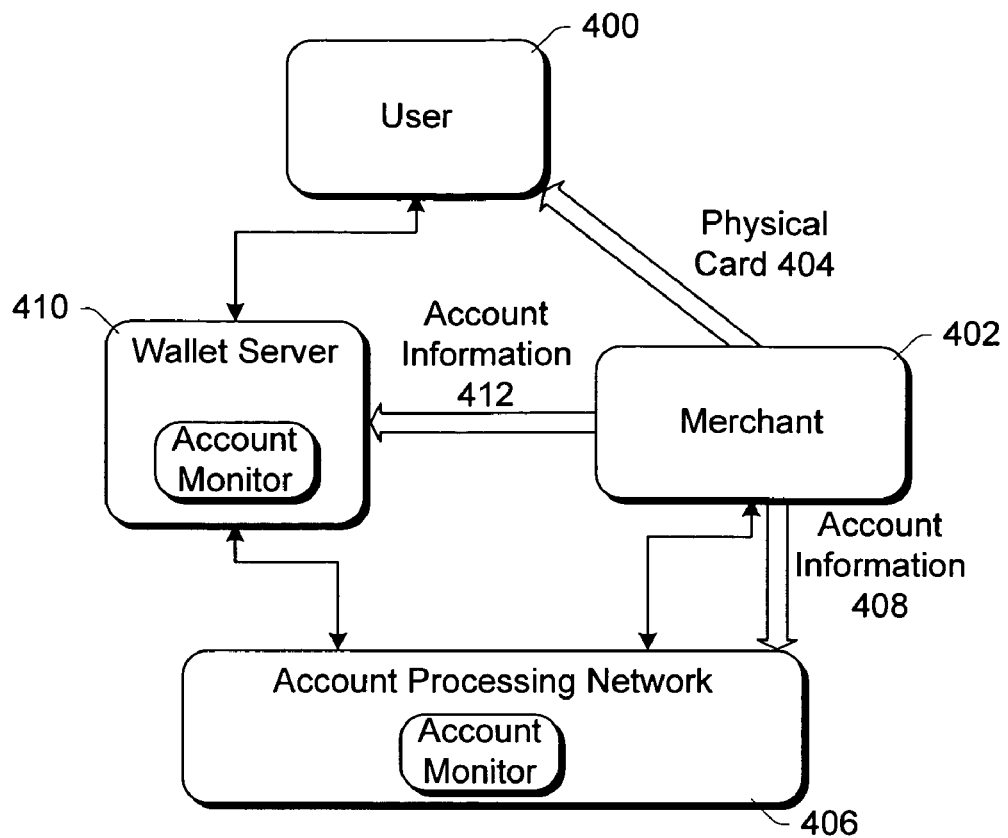
FIG. 8 is a block diagram illustrating an exemplary process for distribution and use of a merchant-specific payment account in accordance with certain embodiments of the invention.

FIG. 8 is a block diagram illustrating an exemplary process for distribution and use of a merchant-specific payment account in accordance with certain embodiments of the invention. A user 400 purchases a payment account from a merchant 402. This purchase can be an in-person purchase (e.g., physically in the merchant's store) or alternatively an on-line purchase (or purchase through some other intermediary). Upon purchasing the payment account, merchant 402 delivers to user 400 a physical card 404 that corresponds to the payment account. Physical card 404 can be created in any of a wide variety of manners, such as including information identifying the payment account on a magnetic stripe on card 404, in a memory device of card 404 (e.g., in the situation of a smart card), etc. The information included on physical card 404 is the same information that would be stored in the user's electronic wallet for a payment account (e.g., account number, expiration date, fraud protection numbers, amount of funds in the account, etc.) as well as restriction information that restricts usage of the payment account to merchant 402.

Additionally, merchant 402 delivers to account processing network 406 (e.g., platform 280 of FIG. 4), account information 408. Account information 408 includes information necessary for network 406 to verify the authenticity of the account for a subsequent purchase. Account information 408 also optionally includes restriction information that restricts usage of the payment account to merchant 402. Alternatively, merchant 402 may communicate account information 408 to network 406 via an intermediary, such as wallet server 410.

Merchant 402 may also deliver to wallet server 410 (e.g., wallet server 106 of FIG. 4) account information 412 for the new payment account. Account information 412 includes identifying information for the account (e.g., account number, expiration date, fraud protection numbers, amount of funds in the account, etc.) as well as restriction information that restricts usage of the payment account to merchant 402. The account information 412 is stored in the electronic wallet corresponding to user 400 at wallet server 410. Alternatively, the account information 412 may be stored in the electronic wallet of another user that is identified by user 400 (e.g., the intended recipient of the payment account, such as for a gift certificate payment account).

When user 400 (or another individual using the payment account, such as someone who received the payment account as a gift from user 400) attempts to make a purchase in-person at merchant 402 using the physical card 404, the account information (stored on card 404) is transmitted to account processing network 406. Account processing network 406 verifies the integrity of the account as well as the restrictions (which might be handled by the issuing institution behind the bank ATM network, for example) and available funds, and indicates the purchase can be permitted if the integrity and restrictions of the account are satisfied and sufficient funds are available. Alternatively, user 400 may attempt to make an on-line purchase at merchant 402 using the account information stored in his or her electronic wallet. The purchasing process in this situation is the same, except that the account information is transmitted to account processing network 406 from the user's electronic wallet on wallet server 410 rather than from physical card 404.

The payment account distribution and use system illustrated in FIG. 8 provides a mechanism via which merchants can easily distribute payment accounts. These payment accounts can be issued in physical card format and/or electronic format for storage in an electronic wallet. The system of FIG. 8 allows merchants to take advantage of an account processing network 406, implemented by someone other than the merchant, to manage payment accounts such as gift certificates and rebates, thereby easing the management functions required of the merchants to support such payment accounts.

There are many uses for this payment account distribution and use system illustrated in FIG. 8. By way of example, a traditional "brick and mortar" merchant is able to issue gift certificates in the form of plastic cards and/or an electronic format that make use of an existing account processing network (e.g., in a Visa® card format being verified via FDC) but that are redeemable only at that merchant. Purchasing of these gift certificates can be via one or more merchant-branded web pages, so that the account is displayed to the purchaser as being associated with the merchant (and any use of the Visa® card format being hidden from the user). This is particularly valuable for smaller merchants, as it relieves them of the burden of establishing the account processing network themselves while at the same time ensuring that the gift certificates it issues are redeemable only at that merchant. By way of another example, an online merchant can sell gift certificates in an analogous manner, issuing them in an electronic format and/or plastic card format. Such gift certificates are thus also restricted to being redeemed only at that merchant, yet the merchant is not required to establish the account processing network to verify the gift certificates.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
    maintaining on a server a plurality of payment accounts in a user-accessible electronic wallet corresponding to a particular user, wherein each payment account stores information that identifies a particular set of one or more additional users that are allowed to add funds to the payment account and an associated external account where funds available to the user are maintained; and
    restricting by the server where the funds to be added to a first of the plurality of payment account in the electronic wallet corresponding to a particular user can be received from, wherein the restricting comprises allowing only the particular set of the one or more additional users to add funds to the first of the plurality of payment account.

2. A method as recited in claim 1, wherein the electronic wallet is maintained at a remote server.

3. A method as recited in claim 1, wherein the first payment account comprises a gift certificate account.

4. A method as recited in claim 1, wherein the first payment account comprises a cash account.

5. A method as recited in claim 1, further comprising restricting the first payment account to being combinable with only a particular one or more other payment accounts.

6. A method as recited in claim 1, further comprising restricting different payment accounts in the electronic wallet.

7. One or more computer-readable memories containing a computer program that is executable by a processor to perform a method, the method comprising:
    maintaining on a server a plurality of payment accounts in a user-accessible electronic wallet corresponding to a particular user, wherein each payment account stores information that identifies a particular set of one or more additional users that are allowed to add funds to the payment account and an associated external account where funds available to the user are maintained;

restricting by the server where the funds to be added to a first of the plurality of payment account in the electronic wallet corresponding to a particular user can be received from, wherein the restricting comprises allowing only the particular set of the one or more additional users to add funds to the first of the plurality of payment account.

8. The one or more computer-readable memories recited in claim 7, wherein the electronic wallet is maintained at a remote server.

9. The one or more computer-readable memories recited in claim 7, wherein the first payment account comprises a gift certificate account.

10. The one or more computer-readable memories recited in claim 7, wherein the first payment account comprises a cash account.

11. The one or more computer-readable memories recited in claim 7, further comprising restricting the first payment account to being combinable with only a particular one or more other payment accounts.

12. The one or more computer-readable memories recited in claim 7, further comprising restricting different payment accounts in the electronic wallet.

* * * * *